United States Patent [19]

Hidaka

[11] 4,022,079
[45] May 10, 1977

[54] SHIFTING MECHANISM FOR POWER TRANSMISSION

[75] Inventor: Yoshiaki Hidaka, Wako, Japan

[73] Assignee: Honda Giken Kogyo Kabushiki Kaisha, Tokyo, Japan

[22] Filed: Jan. 26, 1976

[21] Appl. No.: 652,135

[30] Foreign Application Priority Data
Jan. 31, 1975    Japan .............................. 50-12310

[52] U.S. Cl. ..................................... 74/476; 74/477
[51] Int. Cl.² ......................................... G05G 5/10
[58] Field of Search ............................. 74/476, 477

[56] References Cited
UNITED STATES PATENTS

| | | | |
|---|---|---|---|
| 3,319,479 | 5/1967 | Iavelli et al. | 74/476 X |
| 3,456,522 | 7/1969 | Bieber | 74/476 X |
| 3,526,151 | 9/1970 | Miller | 74/477 |
| 3,636,793 | 1/1972 | Bieber | 74/476 X |

Primary Examiner—Allan D. Herrmann
Attorney, Agent, or Firm—Polster and Polster

[57] ABSTRACT

A shifting mechanism for power transmission device in an automotive vehicles, wherein, when gear shifting of the fifth or third speed gear and the reverse gear is to be done by reciprocating movement of a fifth speed fork shaft, an engaging or control pin of the shift fork shaft is permitted to move at the time of the fifth speed gear shifting by forming an L-shaped control slot in a shift lever, thereby avoiding undesirable influence on the shifting mechanism of a reverse idle gear.

4 Claims, 3 Drawing Figures

SHIFTING MECHANISM FOR POWER TRANSMISSION

BACKGROUND OF THE INVENTION

This invention relates to a power transmission mechanism in an automotive vehicles, etc., and more particularly, it is concerned with a shifting mechanism in a five-stage or three-stage power transmission mechanism.

In this kind of power transmission mechanism, there has already been known a construction such that a reverse gear is interposed between the first speed gear and the second speed gear, and the driving force is transmitted from a main reverse gear to a counter reverse gear through a reverse idle gear.

In the above known construction of the power transmission mechanism, there has been proposed a modified construction such that the shifting of the reverse idle gear and the fifth or third speed gear is carried out by reciprocating movement of a single common shift fork shaft, or simultaneously moving two shift fork shafts. In this mechanism, however, the reverse idle gear should be moved unnecessarily in the direction opposite to the reverse shifting direction at the time of shifting to the fifth or third speed gear, and a space to permit the movement is required to be provided between the first and the second speed gears, on account of which the total length of the power transmission mechanism increases in its axial direction. Such prolonged shaft length has been a great and serious obstacle in a vehicle, on which the power transmission mechanism is mounted in the direction perpendicular to the longitudinal direction of the vehicle body.

SUMMARY OF THE INVENTION

It is therefore an object of the present invention to provide a compact power transmission mechanism, wherein the length of the power transmission mechanism in the shaft direction thereof by constructing the entire mechanism in such a manner that no bad influence whatsoever is caused to the reverse idle gear at the time of shifting to the fifth or third speed gear.

According to the present invention, generally speaking, there is provided a shifting mechanism for five- or three-stage power transmission in an automotive vehicle of a construction, wherein a reverse gear is interposed between a first speed gear and a second speed gear mounted on a main gear shaft and a counter gear shaft, and a driving power is transmitted from a main reverse gear to a counter reverse gear through a reverse idle gear, the mechanism comprising; an oscillatable shift lever for shifting the reverse idle gear; and L-shaped control slot formed in one part of the shift lever and having a vertical section and a horizontal section; a control pin slidably engaged with the L-shaped control slot; and a shift fork shaft for the fifth or third speed gear which is fixed to the control pin, the shifting of the control pin being permitted by the horizontal section of the control slot to maintain the shift lever in an unmovable state at the time of shifting to the fifth or third speed gear, while shifting of the control pin being transmitted to the shift lever by the vertical section of the L-shaped control slot.

The foregoing object and other objects of the present invention as well as the detailed construction and the resulting function and effect thereof will become more clearly understandable from the following description, when read in conjunction with the accompanying drawing.

DETAILED DESCRIPTION OF PREFERRED EMBODIMENT

Figure 1:
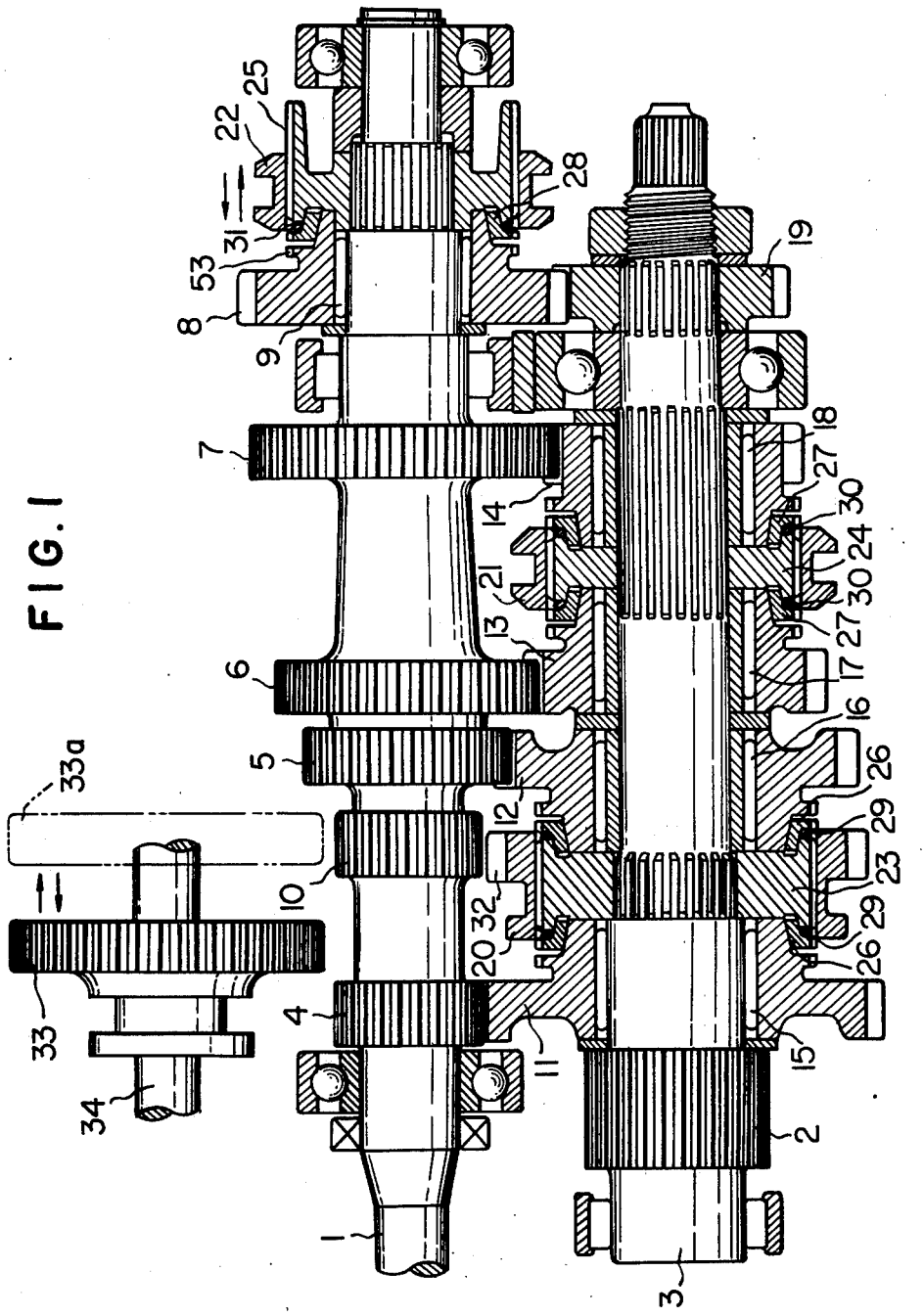
FIG. 1 is a side elevational view, partly in longitudinal cross-section, of a gear train in a power transmission mechanism for automotive vehicles.

Referring now to FIG. 1 which shows a gear train for a five-stage power transmission mechanism, a main shaft 1 which is coaxial wih a clutch (not shown) and a counter shaft 3 having a final drive gear 2 are arranged in parallel each other. On the main shaft 1, there are sequentially mounted first to fourth speed gears 4 to 5 and fixed thereon at an appropriate space interval. The fifth speed gear 8 is mounted on this main shaft 1 through a bearing 9. Between the first speed gear 4 and the second speed gear 5 on the main shaft 1, there is mounted and fixed a main reverse gear 10. On the other hand, counter speed gears 11 to 14 constantly meshed in corresponding manner with the first to fourth speed gears 4 to 7 are fixedly mounted on the counter shaft 3 through respective bearings 15 to 18, while a counter fifth speed gear 19 constantly meshed with the main fifth speed gear 8 is spline-connected.

Between the counter first and second speed gears 11, 12 and the counter third and fourth speed gears 13, 14, there are provided speed gear selecting sleeves 20, 21 to be operated by a shift fork (not shown). Similarly, a speed gear selecting sleeve 22 is provided outside the main fifth speed gear 8. Furthermore, in order to take synchronism in engaging the speed gear selecting sleeves 20 to 22 with the respective speed gears 11 to 14 and 8, there is provided a synchronous meshing mechanism consisting of synchronizer hubs 23 to 25 which are spline-connected with the main shaft 1 and the counter shaft 3, and, at the outer periphery of which the respective speed gear selecting sleeves 20 to 22 are engaged, blocking rings 26 to 28 interposed between the respective synchronizer hubs and the boss for the respective speed gears 11 to 14 and 8, and synchronizer springs 29 to 31. A counter reverse gear 32 is provided on the outer peripheral surface of the counter first and second speed gear selecting sleeve 20 in confrontation to the main reverse gear 10. A reverse idle gear 33 which transmits driving force from the main reverse gear 10 to the counter reverse gear 32 is provided in a slidable manner on a rotational shaft 34 held by a casing (not shown) in proximity to the first speed gears 4, 11.

Figure 2:
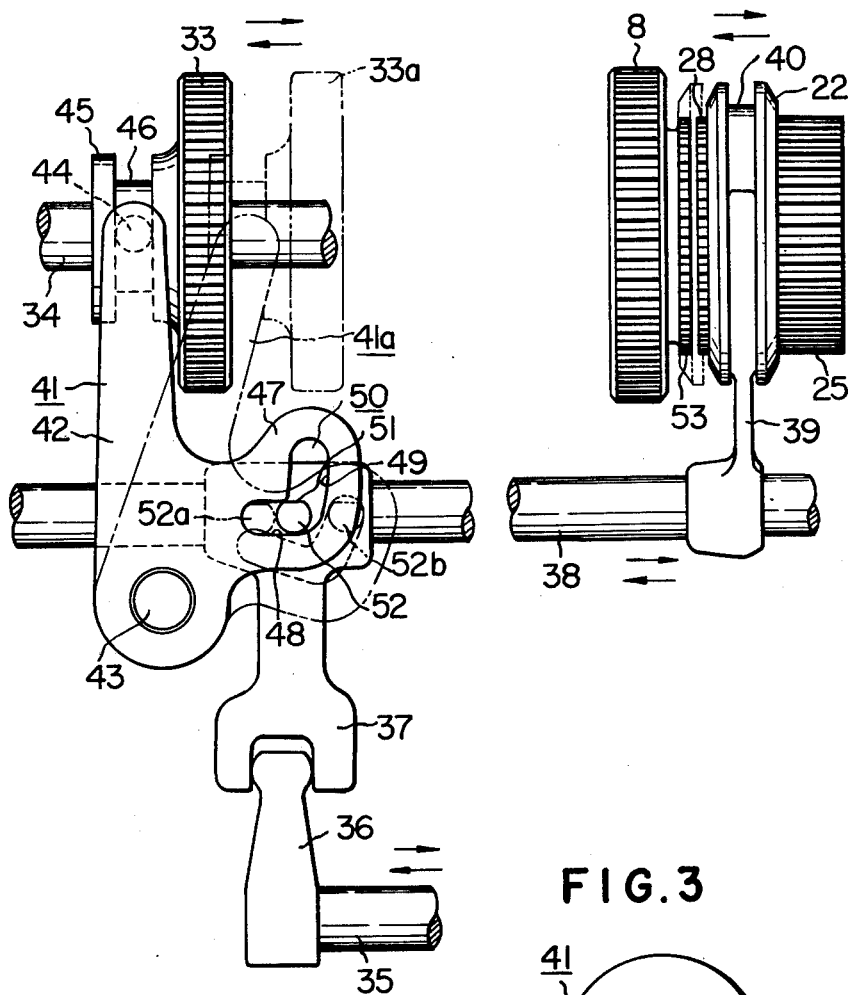
FIG. 2 is a side elevational view of a shifting mechanism for the reverse and the fifth speed gears.
Figure 3:
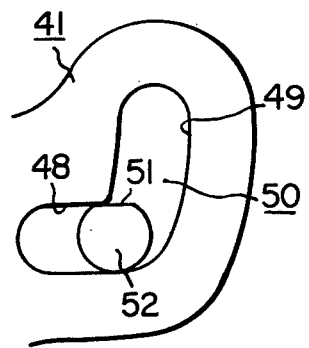
FIG. 3 is a partially enlarged view showing a state of engagement between an L-shaped control slot and an engaging or control pin.

FIG. 2 shows a shifting mechanism for the reverse idle gear 33 and the main fifth speed gear 8 of the above-described construction, in which a shift rod 35 to be interconnected with a change lever (not shown) has a change selector 36 at its tip end, and a shift fork shaft 38 to be engaged with this change selector 36 and provided with the fifth speed and reverse shift piece 37 is slidably held in the casing (not shown). At one end of this shift fork shaft 38, there is fixed a shift fork 39 which in turn is engaged with an annular groove 40 of the fifth speed gear selecting sleeve 22. A shift lever 41 to shift the abovementioned reverse idle gear 33 is substantially in an L-shape, and is rotatably fitted to a shaft 43 at the lower part of its vertical section 42. A shift pin 44 is fixed at the tip end of this vertical section 42 of the shift lever 41, with which an annular groove 46 formed in a boss 45 for the shift pin 44 and the reverse idle gear 33 is engaged. Further, a horizontal section 48 of the slot is disposed in parallel with a horizontal section 47 of the shift lever in the sliding direction of the shift fork shaft 38, and a vertical section 49 of the slot is made substantially in parallel with a vertical section 42 of the shift lever 41, in which a control slot 50 in the shape of an oppositely directed letter L is formed. The inside surface of the slot 50 is rectilinear, while its outside surface is in a gentle arcuate shape. Onto the abovementioned shift piece 37 (or the fifth speed shift fork shaft 38), there is a fixed a control pin 52, a part of the peripheral surface of which is notched to form a flat surface 51 which in turn is engaged with the abovementioned L-shaped control slot 50. The engagement relationship between them is such that, as shown in FIG. 3, the control pin 52 is positioned at the bent portion of the L-shaped slot 50 in the neutral state when the shifting to the reverse and the fifth speed gears is not to be performed, and a part of its flat surface 51 is contacted with the rectilinear inside surface of the horizontal section 48 of the slot. Accordingly, the length of chord formed at one part of the control pin 52, i.e., the flat surface 51, to meet the horizontal section 48 of the slot 50 is slightly smaller than the width of the control slot 50 at its horizontal section 48, and its diameter if formed slightly smaller than the width of the control slot 50 at its vertical section 49.

In the above-described construction, when the shift rod 35 is shifted leftward, as shown in FIG. 2, at the time of the shifting to the fifth speed gear, the force of the shifting is transmitted to the fifth speed shift fork shaft 38 and the shift fork 39 through the change selector 36 and the shift piece 37, whereby the sleeve 22 moves toward the left to be engaged with the gear 53 formed on the boss of the fifth speed gear 8 and to transmit the driving force to the counter shaft 3 through the main fifth speed gear 8 and the counter fifth speed gear 19. At this shifting, the control pin 52 slides in the horizontal section 48 of the L-shaped control slot 50 into the end part 52a thereof as shown by a double dotted chain line, to thereby permit the leftward shifting of the shaft 38, with the consequence that no influence whatsoever is given to the shift lever 41, and the reverse idle gear 33 does not shift.

At the time of the reverse shifting, when the shift rod 35 is shifted rightward from the position indicated by a solid line in FIG. 2, the fifth speed shift fork shaft 38 also moves rightward by the force of shifting exerted by the shift rod 35. Then, the control pin 52 is permitted to move by the vertical section 49 of the slot to reach the position 52b as indicated by the double dotted chain line, whereby the shift lever 41 oscillates in the clockwise direction into a position 41a shown by the chain line with the shaft 43 as the center of oscillation thereof. Accordingly, the reverse idle gear 33 moves rightward into a position 33a shown by a double dotted chain line through the shift pin 44 to be meshed with the main reverse gear 10 and the counter reverse gear 32, thereby transmitting the driving force of the main reverse gear 10 to the counter shaft 3. At this reverse shifting, the fifth speed gear selecting sleeve 22 shifts rightward on the synchronizer hub 25.

The foregoing explanations have been made with reference to the embodiment of shifting mechanism for the five-stage power transmission device. It should, however, be noted that similar construction of the shifting mechanism can be applied to a case of three-stage power transmission device.

As so far mentioned in the foregoing, the present invention is so constructed that, in performing the shifting operation for the fifth (or third) speed gear as well as for the reverse gear by the reciprocating movement of the fifth speed shift fork shaft 38, the control pin 52 of the shift fork shaft 38 is made movable at the time of the fifth speed gear shifting by the L-shaped control slot 50 formed in the shift lever 41, so that no undesirable influence whatsoever may be caused on the gear shifting mechanism of the reverse idle gear 33. As the consequence of this improved construction, no space is indispensable for shifting the reverse idle gear 33 at the time of the fifth speed gear shifting, hence the power transmission mechanism can be shortened in the direction of the shaft length. Further, as it is possible to dispose the reverse idle gear 33 as closely as possible to the main first speed gear 4, any apprehension can be removed as to possibility of the sleeve 20 being meshed with the reverse idle gear 33 at the time of selecting the first speed gear. In addition, the shifting mechanism is so designed that, at the time of the non-shifting operation, the shift lever 41 may be supported at three points of the control pins 44, 52 and the rotational axis 43, each of which is positioned at each vertex of a triangle, so that vibration caused to the shift lever 41 can be prevented. Moreover, in this three point supporting, if a part of the control pin 52 is notched and a part of the horizontal surface 51 thereof is made contacted with the inside surface of the horizontal section of the slot 50, the vibration preventive effect can be much more improved.

Although the present invention has been described with particularity in reference to the preferred embodiment thereof, it should be understood that the invention is not limited to this embodiment alone, but any changes and modifications may be made by those skilled in the art without departing from the spirit and scope of the invention as set forth in the appended claims.

What is claimed is:

1. A shifting mechanism for five-stage or three-stage power transmission in an automotive vehicle of a construction, wherein a reverse gear is interposed between a first speed gear and a second speed gear fitted on a main gear shaft and a counter gear shaft, and a driving force is transmitted from a main reverse gear to a counter reverse gear through a reverse idle gear, said mechanism comprising:

an oscillatable shift lever for shifting said reverse idle gear;

an L-shaped control slot formed in one part of said shift lever, and having a vertical section and a horizontal section;

a control pin slidably engaged with said L-shaped control slot; and a shift fork shaft for the fifth or third speed gear which is fixed to said control pin, shifting of said control pin being permitted by the horizontal section of said control slot to maintain said shift lever in an unmovable state at the time of shifting to the fifth or third speed gear, while shifting of said control pin being transmitted to said shift lever by the vertical section of said L-shaped control slot.

2. The shifting mechanism as claimed in claim 1, wherein an annular groove is formed in a boss of said reverse idle gear, and a shift pin provided on said shift lever is slidably engaged with said annular groove.

3. The shifting mechanism as claimed in claim 2, wherein said shift pin of said shift lever, a rotational shaft of said shift lever, and said control pin are respectively disposed at a position corresponding to a vertex of a triangle so as to support said shift lever at three points.

4. The shifting mechanism as claimed in claim 1, wherein a horizontal surface is formed on one part of said control pin, and the inner surface of said L-shaped control slot of said shift lever is surface-contacted with said horizontal surface.

* * * * *